F. L. POPE.
Circuits for Electric Railroad Signals.
No. 140,536.  Patented July 1, 1873.
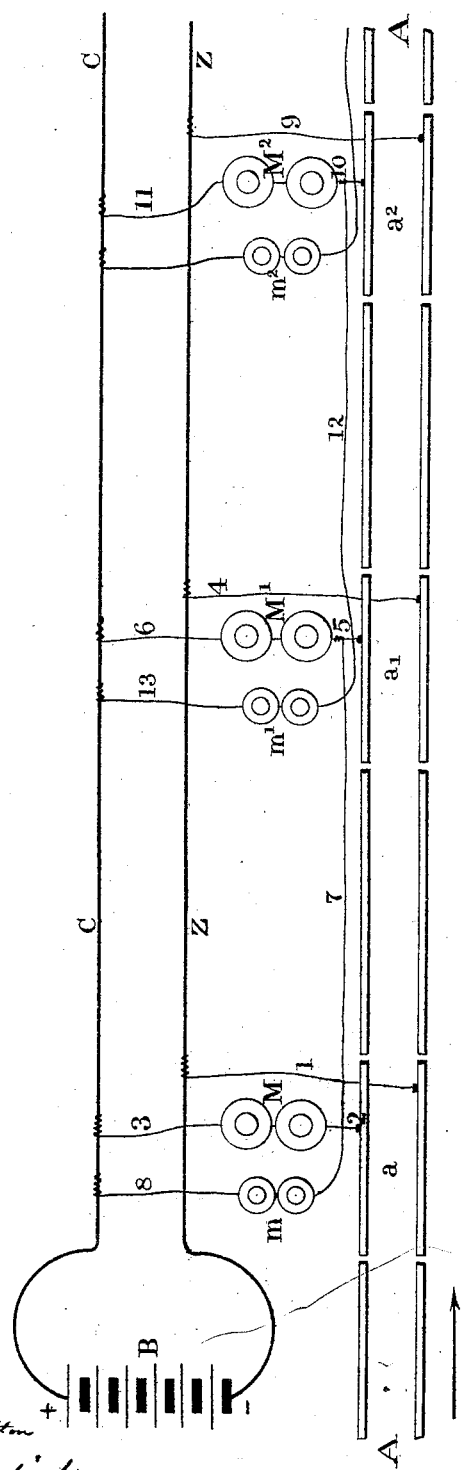
Witnesses:
Geo. A. Hamilton
Stephen C. Hendrickson
Inventor:
Frank L. Pope

UNITED STATES PATENT OFFICE.

FRANK L. POPE, OF ELIZABETH, NEW JERSEY.

IMPROVEMENT IN CIRCUITS FOR ELECTRIC RAILROAD SIGNALS.

Specification forming part of Letters Patent No. 140,536, dated July 1, 1873; application filed May 15, 1873.

*To all whom it may concern:*

Be it known that I, FRANK L. POPE, of Elizabeth, in the county of Union and State of New Jersey, have invented certain new and useful Improvements in Electric Signaling Apparatus for Railroads; and I do hereby declare that the following is a full, clear, and exact description thereof, reference being had to the accompanying drawing, which forms part of this specification.

My invention consists in a peculiar arrangement of electric circuits, in combination with a battery, and with two or more circuit-closers operated by moving trains or otherwise, whereby a series of two or more visual or audible signals, situated at intervals along the line of a railroad, may be operated by currents of electricity derived from a single battery, thereby obviating the inconvenience and expense of employing, as heretofore, one or more separate batteries situated at or near each signal for the purpose of actuating the same.

In the accompanying drawing, A A represent a portion of the track of a railroad. At intervals of, say, a mile, more or less, sections of the said track, $a$ $a^1$ $a^2$, are electrically insulated from the remainder in a manner well understood, and therefore requiring no detailed description. B is a galvanic battery, of any suitable construction, and placed in any convenient location near the line of the railroad. Two wires or other conductors, C and Z, are attached to the positive and negative poles, respectively, of the battery B, and extended to any required distance in a direction parallel or nearly so to the line of the railroad. The conductors C and Z may be placed on poles, and should be suitably insulated from each other and from the earth. The conductors C and Z are virtually prolongations of the positive and negative poles of the battery B. Each of the insulated sections of track $a$ $a^1$ $a^2$, &c., is placed at some point at or near which it is desired to erect a signal, and any required number of these may be employed to meet the requirements of any particular case. M, $M^1$, and $M^2$ are the electro-magnets, which actuate or display the respective signals. The said signals may be of any suitable construction, and should be provided with some suitable means of retaining them in position or action after the circuit through the magnets M $M^1$ or $M^2$ has been interrupted. $m$, $m^1$, and $m^2$ are magnets so arranged as to release, reverse, or stop the action of said signals, which have previously been brought into action by the magnets M, $M^1$, and $M^2$.

The operation of the apparatus is as follows: Suppose a train moving along the track A A from left to right in a direction indicated by the arrow. Upon reaching the point $a$, the wheels and axles of the train will form an electrical connection between the opposite insulated rails, and a circuit will be formed between the conductor C and the conductor Z, traversing wires 1 and 2, magnet M, and wire 3, and the signal attached to M will consequently be displayed. Upon the arrival of the train at $a^1$ the same operation will be repeated, and another connection formed between C and Z, traversing the wires 4 and 5, magnet $M^1$, and wire 6, while at the same time a portion of the current will traverse the branch-wire 7, magnet $m$, and wire 8. Thus the signal attached to $M^1$ will be actuated, and simultaneously the action of the magnet $m$ will release or reverse the action of the first-mentioned signal. Upon reaching the point $a^2$ the closing of the circuit by the train will, in like manner, cause the signal attached to $M^2$ to be displayed, and the signal last displayed by $M^1$ to be withdrawn. In this manner any required number of such signals may be operated by means of a single battery.

The respective resistances of the several circuits should be so adjusted that they will be as nearly as possible equal to each other, as a much more perfect action of the apparatus will be secured thereby.

On a railroad having a double track two separate series of signals, one series for each track, may be connected with the conductors C and Z of a single battery, if required. If preferable they may be also operated by means of separate batteries and separate conductors.

In cases where it is required to operate a large number of signals, extending along the road for a distance of many miles, the two conductors C and Z may be extended the entire distance, and a number of batteries attached at convenient intervals, say, for instance, from five to ten miles apart. The several batteries should all be placed with their positive poles in connection with the wire C, and their negative poles in connection with the wire Z, when they will virtually form one large battery, and the principle of operation will remain the same as that hereinbefore described.

I do not desire to confine myself to the use of any particular form of visual or audible signals, nor to the particular devices herein described for closing the electric circuit at points from which a signal is to be operated. Instead of the circuit being closed automatically by the train itself, it may be closed by a signalman by means of a key or switch, or otherwise.

I claim as my invention—

1. The battery B, in combination with the positive and negative conductors C and Z, two or more electro-magnets, M $M^1$ $M^2$, for actuating or causing to be actuated visual or audible signals, and two or more circuit-closers, $a$ $a^1$ $a^2$, placed at intervals along the line of a railroad, substantially as and for the purpose specified.

2. The battery B, in combination with the positive and negative conductors C and Z, two or more electro-magnets $m$ $m^1$ $m^2$, for releasing or reversing visual or audible signals, and two or more circuit-closers $a^1$ $a^2$, placed at intervals along the line of a railroad, substantially as and for the purpose specified.

3. The combination of the battery B, conductors C and Z, circuit-closer $a$, and electro-magnet M, for actuating a visual or audible signal, with the circuit-closer $a^1$, wires 5, 7, and 8, and electro-magnet $m$, for reversing, releasing, or stopping said signal, substantially as specified.

FRANK L. POPE.

Witnesses:
JAMES N. ASHLEY,
STEPHEN C. HENDRICKSON.